(12) United States Patent
Tsai

(10) Patent No.: US 12,202,238 B2
(45) Date of Patent: Jan. 21, 2025

(54) EMBOSSING APPARATUS FOR PRODUCING MULTILAYER WEB PRODUCT

(71) Applicant: CHAN LI MACHINERY CO., LTD., Taoyuan (TW)

(72) Inventor: Tung-I Tsai, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 151 days.

(21) Appl. No.: 18/054,679

(22) Filed: Nov. 11, 2022

(65) Prior Publication Data
US 2024/0123720 A1    Apr. 18, 2024

(30) Foreign Application Priority Data
Oct. 18, 2022   (TW) .................................. 111139509

(51) Int. Cl.
| | |
|---|---|
| B32B 37/00 | (2006.01) |
| B32B 3/28 | (2006.01) |
| B32B 7/14 | (2006.01) |
| B32B 37/12 | (2006.01) |
| B32B 37/20 | (2006.01) |
| B32B 38/06 | (2006.01) |
| B32B 39/00 | (2006.01) |

(52) U.S. Cl.
CPC ............ *B32B 37/0053* (2013.01); *B32B 3/28* (2013.01); *B32B 7/14* (2013.01); *B32B 37/1292* (2013.01); *B32B 37/20* (2013.01); *B32B 38/06* (2013.01); *B32B 39/00* (2013.01); *B32B 2250/03* (2013.01); *B32B 2311/30* (2013.01); *B32B 2319/00* (2013.01)

(58) Field of Classification Search
CPC ......... B32B 37/0053; B32B 3/28; B32B 7/14; B32B 37/1292; B32B 38/06; B32B 39/00
USPC .......................................................... 428/152
See application file for complete search history.

(56) References Cited

U.S. PATENT DOCUMENTS

| | | | | |
|---|---|---|---|---|
| 2011/0186237 A1* | 8/2011 | Lin | ........................... | B31F 1/07 |
| | | | | 156/549 |
| 2011/0271852 A1* | 11/2011 | Lin | ........................... | B31F 1/07 |
| | | | | 101/23 |
| 2014/0251530 A1* | 9/2014 | Giurlani | .................... | B31F 1/07 |
| | | | | 156/209 |

FOREIGN PATENT DOCUMENTS

| | | |
|---|---|---|
| JP | 2014522752 A | 9/2014 |
| TW | I432312 B | 4/2014 |

OTHER PUBLICATIONS

First Office Action issued to Taiwanese counterpart Application No. 111139509 on Mar. 2, 2023.

(Continued)

*Primary Examiner* — Tahseen Khan
(74) *Attorney, Agent, or Firm* — Rosenberg, Klein & Lee

(57) ABSTRACT

An embossing apparatus for producing a multilayer web product includes a first embossing assembly, a second embossing assembly, and at least one intermediate embossing assembly. A lapping roller is arranged adjacent to the first embossing assembly to lap at least one intermediate web product that is formed with an intermediate embossed pattern and a first web product that is formed with a first embossed pattern together to form a lapped web product. A glue applying device is arranged adjacent to the first embossing assembly to apply glue on one surface of the lapped web product. A laminating roller laminates the lapped web product and the second web product that is formed with a second embossed pattern together.

11 Claims, 2 Drawing Sheets

(56) References Cited

OTHER PUBLICATIONS

First Office Action mailed for Japanese Counterpart Patent Application No. 2022-191662 on Jul. 5, 2023.

* cited by examiner

EMBOSSING APPARATUS FOR PRODUCING MULTILAYER WEB PRODUCT

BACKGROUND OF THE INVENTION

1. Field of the Invention

The present invention relates to an embossing apparatus, and more particularly to an embossing apparatus for producing multilayer product.

2. The Related Arts

Web products are widely used in daily living, commercial applications, and industrial applications. Web products having embossed/debossed patterns are now the main stream of contemporary uses.

To make various embossed/debossed patterns on a web product, it is common to pass the web product through an embossing roller set, in which an embossing pattern on the embossing roller set is imprinted on the web product so as to form an embossed pattern on the web product. Further, to make the web product fluffy and solid hand-feeling when used by users, two layers of web product are glued and laminated together to form a web product having a three-dimensional embossed pattern.

However, in the prior art, in a fabrication process for making an embossed pattern on a web product, due to insufficient support for the embossed pattern, a product so made may easily suffer collapse and unclearness of the pattern. Consequently, a user, when using such a web product, may feel that the web product manufactured with such a known technique has poor fluffiness.

Such a problem is common for dual-layered web products. The reason is that in making a dual-layered web product, two separate layers of web product are simultaneously fed in an embossing mechanism, and this way cannot make a surface pattern of the web products prominent. Further, no intermediate layer having a sufficient strength is arranged between the two separate layers of web product to provide a desired support to the surface patter of the web products.

Further, to enhance fluffiness, solidness of hand-feeling, and also to provide sufficient support, for a web product, the manufacturers often adopt a solution of increasing the amount of fibrous material used in such a product. This inevitably increases the expenses for the fibrous material in the fabrication of the web product.

SUMMARY OF THE INVENTION

In view of the above, the primary objective of the present invention is to provide an embossing apparatus for producing a laminated multilayer web product featuring excellent fluffiness, good support, solid hand-feeling, embossed patterns being not easily collapsed, and exhibiting clear embossed patterns.

A technical solution adopted in the present invention comprises a first embossing assembly, a second embossing assembly, and at least one intermediate embossing assembly. A lapping roller is arranged adjacent to the first embossing assembly to lap at least one intermediate web product that is formed with an intermediate embossed pattern and a first web product that is formed with a first embossed pattern together to form a lapped web product. A glue applying device is arranged adjacent to the first embossing assembly to apply glue on one surface of the lapped web product. A laminating roller laminates the lapped web product and the second web product that is formed with a second embossed pattern together.

Preferably, the first embossing assembly comprises a first rubber embossing roller and a first steel embossing roller, the second embossing assembly comprises a second rubber embossing roller and a second steel embossing roller, and the intermediate embossing assembly comprises an intermediate rubber embossing roller and an intermediate steel embossing roller.

Preferably, an intermediate feeding path is set at an upper position relative to the intermediate rubber embossing roller, in order to conduct at least one intermediate web product to pass an upper side of the intermediate rubber embossing roller to be then conducted into and conveyed between the intermediate rubber embossing roller and the intermediate steel embossing roller.

In respect of efficacy, a multilayer web product manufactured with the embossing roller set structure allows users to experience effects of excellent fluffiness, good support, and solid hand-feeling. In respect of visual effect, the embossed pattern of the multilayer web product according to the present invention does not easily collapse and shows a clear pattern of embossing.

Since the multilayer web product according to the present invention demonstrates structural characteristics of excellent fluffiness and good support, so that the amount of a fibrous material used can be reduced, to thereby achieve an effect of saving material cost.

A specific technical measure adopted in the present invention will be further described with reference to embodiments provided below and the attached drawings.

DETAILED DESCRIPTION OF THE PREFERRED EMBODIMENTS

Figure 1:
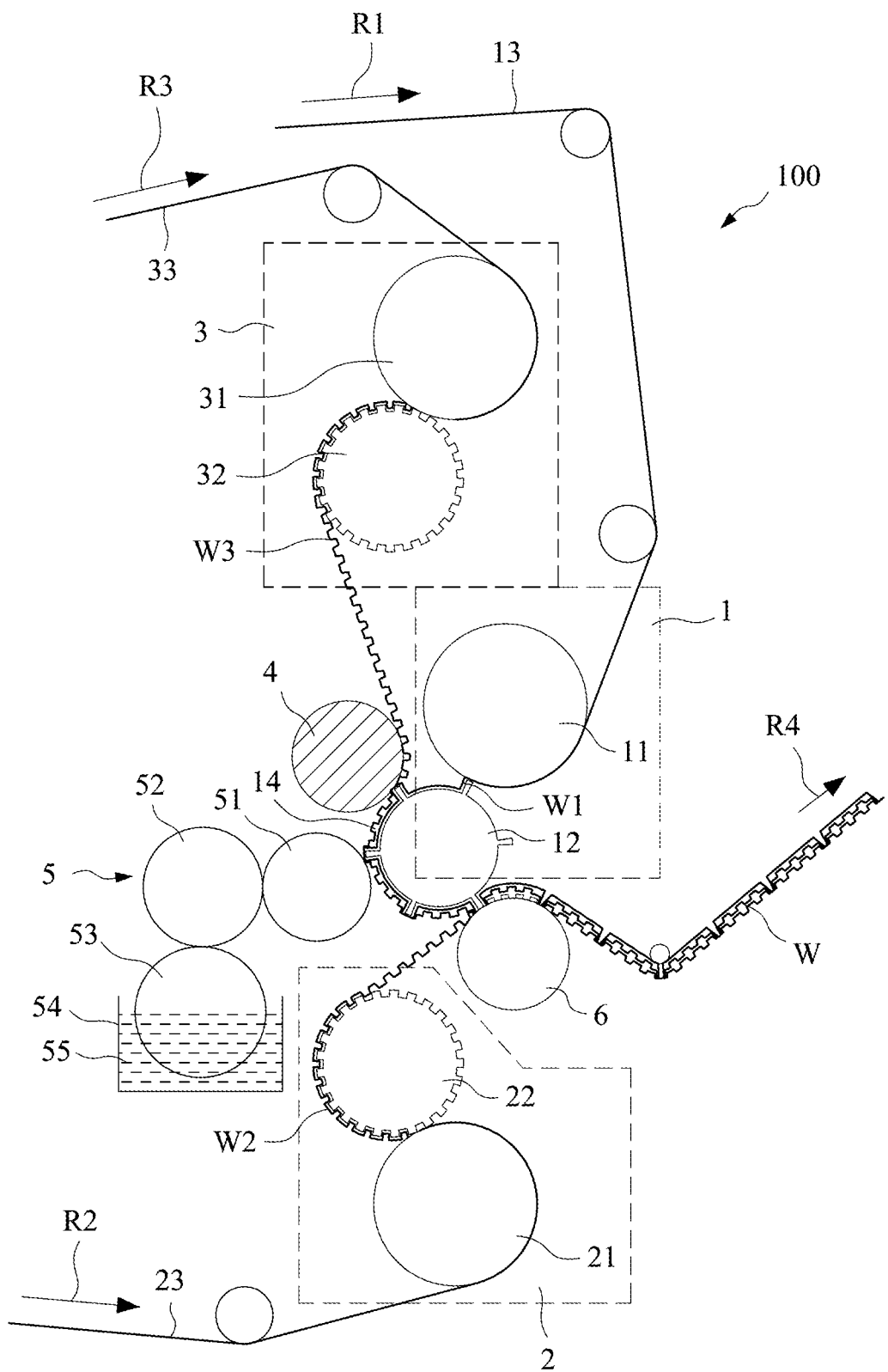
FIG. 1 is a schematic view showing an embossing apparatus according to a preferred embodiment of the present invention.

Referring to FIG. 1, an embossing apparatus 100 according to the present invention comprises a first embossing assembly 1, a second embossing assembly 2, and an intermediate embossing assembly 3. The first embossing assembly 1 and the second embossing assembly 2 are arranged in a manner of being respectively located at upper and lower sides in a vertical direction. The second embossing assembly 2 is located at a lower position relative to the first embossing assembly 1.

The first embossing assembly 1 comprises a first rubber embossing roller 11 and a first steel embossing roller 12. The first steel embossing roller 12 is adjacent to the first rubber embossing roller 11, and is set at a lower position relative to the first rubber embossing roller 11.

A first feeding path R1 is defined at an upper position relative to the first rubber embossing roller 11, and a first web product 13 is moved along the first feeding path R1 to pass an upper side of the first rubber embossing roller 11 to be conducted into and conveyed between the first rubber embossing roller 11 and the first steel embossing roller 12. The first steel embossing roller 12 has a surface that is formed with a recessing-raising structure, so that the first web product 13, when conveyed between the first rubber embossing roller 11 and the first steel embossing roller 12, is subjected to compression and embossing so as to form a first embossed pattern W1 on the first web product 13.

The second embossing assembly 2 comprises a second rubber embossing roller 21 and a second steel embossing roller 22. The second steel embossing roller 22 is adjacent to the second rubber embossing roller 21, and is set at an upper position relative to the second rubber embossing roller 21.

A second feeding path R2 is defined at a lower position relative to the second rubber embossing roller 21, and a second web product 23 is moved along the second feeding path R2 to pass a lower side of the second rubber embossing roller 21 to be conducted into and conveyed between the second rubber embossing roller 21 and the second steel embossing roller 22. The second steel embossing roller 22 has a surface that is formed with a recessing-raising structure, so that the second web product 23, when conveyed between the second rubber embossing roller 21 and the second steel embossing roller 22, is subjected to compression and embossing so as to form a second embossed pattern W2 on the second web product 23.

The intermediate embossing assembly 3 comprises an intermediate rubber embossing roller 31 and an intermediate steel embossing roller 32. The intermediate steel embossing roller 32 is adjacent to the intermediate rubber embossing roller 31, and is set at a lower position relative to the intermediate rubber embossing roller 31.

A third feeding path R3 is defined at an upper position relative to the intermediate rubber embossing roller 31, and a third web product 33 is moved along the third feeding path R3 to pass the intermediate rubber embossing roller 31 to be conducted into and conveyed between the intermediate rubber embossing roller 31 and the intermediate steel embossing roller 32. The intermediate steel embossing roller 32 has a surface that is formed with a recessing-raising structure, so that the third web product 33, when conveyed between the intermediate rubber embossing roller 31 and the intermediate steel embossing roller 32, is subjected to compression and embossing so as to form a third embossed pattern W3 on the third web product 33.

A lapping roller 4 is arranged adjacent to the first steel embossing roller 12 of the first embossing assembly 1. The intermediate web product 33 that has the intermediate embossed pattern W3 formed thereon and the first web product 13 that has the first embossed pattern W1 formed thereon jointly pass between the lapping roller 4 and the first steel embossing roller 12, so as to have the first web product 13 and the intermediate web product 33 overlapping each other to form a lapped web product 14.

A glue applying device 5 is arranged at a position adjacent to the first steel embossing roller 12. The glue applying device 5 comprises a glue application roller 51 corresponding to the first steel embossing roller 12. The glue application roller 51, when being put into rotation, retrieves glue 55 from a glue reservoir 54 by means of the glue attaching rollers 52, 53, so that when the lapped web product 14 is passing between the first steel embossing roller 12 and the glue applying device 5, the glue application roller 51 applies and coats a proper amount of the glue 55 on one surface of the lapped web product 14.

A laminating roller 6 is adjacent to the first steel embossing roller 12, so that the lapped web product 14 having the intermediate embossed pattern W3 formed thereon and the second web product 23 having the second embossed pattern W2 formed thereon are made overlapping each other, and are laminated together when subsequently passing between the laminating roller 6 and the first steel embossing roller 12, to be then fed out along an out-feeding path R4.

Figure 2:
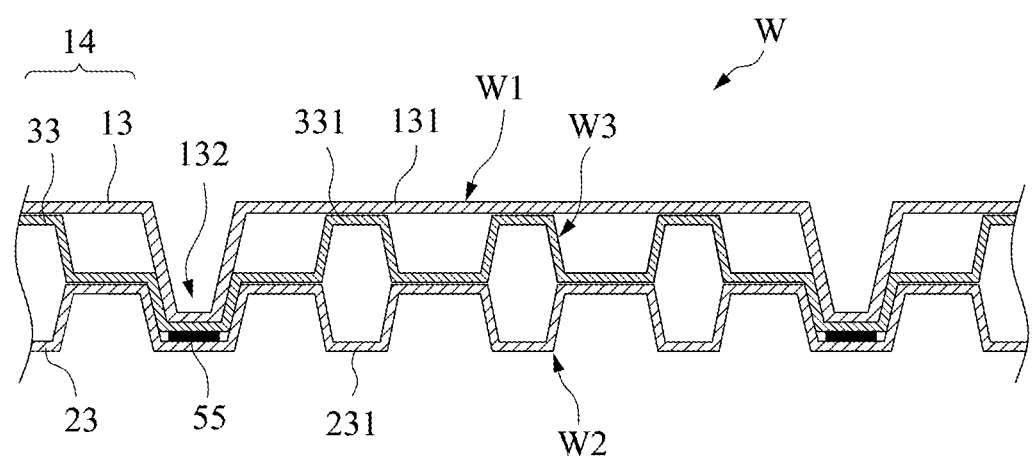
FIG. 2 is a cross-sectional view showing a multilayer web product formed by laminating a first web product, an intermediate web product, and a second web product in an up-down direction according to the present invention.

FIG. 2 is a cross-sectional view showing a multilayer web product W formed by laminating the first web product 13, the intermediate web product 33, and a second web product in an up-down direction according to the present invention. As shown in the drawing, the first web product 13, after being compressed and embossed by the first embossing assembly 1, forms the first embossed pattern W1 that formed of a plurality of large-sized embossing sections 131. The second web product 23, after being compressed and embossed by the second embossing assembly 2, forms the second embossed pattern W2 that is formed of a plurality of small-sized embossing sections 231. The intermediate web product 33, after being compressed and embossed by the intermediate embossing assembly 3, forms the intermediate embossed pattern W3 that is formed of a plurality of intermediate embossing sections 331. The intermediate web product 33 is located between the first web product 13 and the second web product 23.

The first web product 13, the second web product 23, and the intermediate web product 33 are first adhered together at selected areas by the glue 55, and are then laminated together in the up-down direction by the laminating roller 6 to thereby form the multilayer web product W according to the present invention. In a preferred embodiment, an adhering section 132 is defined between every adjacent two of the large-sized embossing sections 131 of the first web product 13, in order to have the second web product 23 and the intermediate web product 33 adhered thereto at the adhering sections 132 by the glue 55. Based on the needs for different embossed patterns, each of the large-sized embossing sections 131 of the first web product 13 may correspond to and cover two or more than two of the small-sized embossing sections 231 of the second web product 23. And, the intermediate embossing sections 331 of the intermediate web product 33 are arranged to correspond to the small-sized embossing sections 231 of the second web product 23 in the up-down direction.

In the embodiment described above, the first embossing assembly 1 and the second embossing assembly 2 are used in combination with one single intermediate embossing assembly 3 to construct the embossing apparatus according to the present invention. In a practical application, two or more than two intermediate embossing assemblies 3 may be used to make a multilayer web product made up of a first embossed pattern W1, a second embossed pattern W2, and multiple intermediate embossed patterns W3.

The embodiments described above are provided only for illustrating the present invention and are not intended to limit the scope of the present invention that is defined in the claims. Equivalent modifications or substitutes that come in the inventive spirit disclosed in the present invention are considered falling within the scope defined by the claims.

What is claimed is:

1. An embossing apparatus for producing a multilayer web product, comprising:
   a first embossing assembly for forming a first embossed pattern to a first web product;
   a second embossing assembly for forming a second embossed pattern to a second web product; and
   at least one intermediate embossing assembly for forming an intermediate embossed pattern to at least one intermediate web product;
   wherein the first embossing assembly includes:
   a first rubber embossing roller, and a first steel embossing roller disposed adjacent to the first rubber embossing roller; and
wherein the first web product is conveyed along a first feeding path to reach and pass between the first rubber embossing roller and the first steel embossing roller, in order to have the first web product formed with the first embossed pattern;
wherein the second embossing assembly includes:
a second rubber embossing roller, and
a second steel embossing roller disposed adjacent to the second rubber embossing roller;
wherein the second web product is conveyed along a second feeding path to reach and pass between the second rubber embossing roller and the second steel embossing roller, in order to have the second embossed pattern formed on the second web product;
a lapping roller disposed adjacent to the first steel embossing roller of the first embossing assembly and operable to lap the at least one intermediate web product that has the intermediate embossed pattern formed thereon and the first web product that has the first embossed pattern formed thereon to form a lapped web product, wherein the at least one intermediate web product having the intermediate embossed pattern and the first web product having the first embossed pattern jointly pass between the lapping roller and the first steel embossing roller to have the first web product and the at least one intermediate web product lapped together to form the lapped web product;
a glue applying device disposed adjacent to the first embossing assembly to apply glue on one surface of the lapped web product; and
a laminating roller disposed adjacent to the first steel embossing roller for laminating, subsequent to the glue is applied on the lapped web product by the applying device, the lapped web product that is applied with the glue and the second web product that is formed with the second embossed pattern together to be fed out along an out-feeding path, wherein the laminating roller is disposed adjacent to the first steel embossing roller to allow the lapped web product having the intermediate embossed pattern and the second web product having the second embossed pattern to pass between the laminating roller and the first steel embossing roller to be laminated together and subsequently fed out along the out-feeding path,
wherein the first feeding path is set at an upper position relative to the first rubber embossing roller, so that the first web product is conveyed over an upper side of the first rubber embossing roller to reach and pass between the first rubber embossing roller and the first steel embossing roller, and
wherein the second feeding path is set at a lower position relative to the second rubber embossing roller, so that the second web product is conveyed over a lower side of the second rubber embossing roller to reach and pass between the second rubber embossing roller and the second steel embossing roller;
wherein the at least one intermediate embossing assembly includes:
an intermediate rubber embossing roller, and
an intermediate steel embossing roller adjacent to the intermediate rubber embossing roller;
wherein the at least one intermediate web product is conveyed along an intermediate feeding path to reach and pass between the intermediate rubber embossing roller and the intermediate steel embossing roller, in order to form the intermediate embossed pattern on the at least one intermediate web product, and
wherein an intermediate feeding path is set at an upper position relative to the intermediate rubber embossing roller in order to conduct the at least one intermediate web product to pass an upper side of the intermediate rubber embossing roller to be subsequently conducted into and conveyed between the intermediate rubber embossing roller and the intermediate steel embossing roller.

2. The embossing apparatus according to claim 1, wherein the glue applying device is disposed adjacent to the first steel embossing roller of the first embossing assembly.

3. The embossing apparatus according to claim 1, wherein the first embossing assembly is arranged at an upper position relative to the second embossing assembly.

4. An embossing apparatus for producing a multilayer web product, comprising:
a first embossing assembly for forming a first embossed pattern to a first web product, wherein said first embossed pattern formed on said first web product includes a plurality of first raised large-sized embossed sections and a plurality of first recessed sections, each first recessed section being disposed between adjacent first large-sized embossed sections of said plurality thereof;
a second embossing assembly for forming a second embossed pattern to a second web product, wherein said second embossed pattern formed on said second web product includes a plurality of second raised embossed sections and a plurality of second recessed sections, each second recessed portion being disposed between adjacent second raised embossed sections of said plurality thereof;
at least one intermediate embossing assembly for forming an intermediate embossed pattern to at least one intermediate web product, wherein said intermediate embossed pattern formed on said at least one intermediate web product includes a plurality of intermediate raised embossed sections and a plurality of intermediate recessed sections, each intermediate recessed section being disposed between adjacent intermediate raised embossed sections of said plurality thereof;
a lapping roller disposed adjacent to the first embossing assembly and operable to lap the at least one intermediate web product having the intermediate embossed pattern formed thereon and the first web product having the first embossed pattern formed thereon to form a lapped web product, wherein in said lapped web product, said each first recessed section of said first embossed pattern is aligned with and received within a respective intermediate recessed section of said plurality of intermediate recessed sections, thus forming a plurality of adhering sections on a surface of said lapped web product, each adhering section of said plurality thereof corresponding to said each first recessed section of said first embossed pattern formed on said first web product aligned with said respective intermediate recessed section of said plurality of intermediate recessed sections of said intermediate embossed pattern formed on said at least one intermediate web product;
a glue applying device disposed adjacent to the first embossing assembly to apply glue on said surface of said lapped web product at said plurality of adhering sections; and a laminating roller disposed adjacent to the first steel embossing roller for laminating, subsequent to application of the glue on the adhering sections on the surface of the lapper web product by the glue applying device, the lapped web product and the second web product formed with the second embossed pattern together, thereby forming a resulting web product to be fed out along an out-feeding path, wherein in said resulting web product, said each adhering section of said plurality of adhering sections formed on said surface of said lapped web product is aligned with and glued within a respective second recessed section of said plurality of second recessed sections of said second embossed pattern formed on said second web product, wherein in said resulting web product, a predetermined number of said intermediate raised sections of said intermediate embossed pattern formed on said intermediate web product are disposed in a contact with said each first large-sized raised section of said first embossed pattern formed on said first web product, and wherein said predetermined number of said intermediate raised sections of said intermediate embossed pattern formed on said intermediate web product are aligned and extend in opposite directions, in a cross-section of the resulting web product, with corresponding second recessed sections of said plurality of second recessed sections of said second embossed pattern formed on said second web product.

5. The embossing apparatus according to claim 4, wherein:
   the first embossing assembly includes:
   a first rubber embossing roller; and
   a first steel embossing roller disposed adjacent to the first rubber embossing roller; and
   wherein the first web product is conveyed along a first feeding path to reach and pass between the first rubber embossing roller and the first steel embossing roller, in order to have the first web product formed with the first embossed pattern; and
   the second embossing assembly includes:
   a second rubber embossing roller; and
   a second steel embossing roller disposed adjacent to the second rubber embossing roller;
   wherein the second web product is conveyed along a second feeding path to reach and pass between the second rubber embossing roller and the second steel embossing roller, in order to have the second embossed pattern formed on the second web product.

6. The embossing apparatus according to claim 5, wherein the lapping roller is disposed adjacent to the first steel embossing roller of the first embossing assembly, and the at least one intermediate web product having the intermediate embossed pattern and the first web product having the first embossed pattern jointly pass between the lapping roller and the first steel embossing roller to have the first web product and the at least one intermediate web product lapped together to form the lapped web product.

7. The embossing apparatus according to claim 5, wherein the laminating roller is adjacent to the first steel embossing roller to allow the lapped web product having the intermediate embossed pattern and the second web product having the second embossed pattern to pass between the laminating roller and the first steel embossing roller to be laminated together and subsequently fed out along the out-feeding path.

8. The embossing apparatus according to claim 5, wherein the first feeding path is set at an upper position relative to the first rubber embossing roller, so that the first web product is conveyed over an upper side of the first rubber embossing roller to reach and pass between the first rubber embossing roller and the first steel embossing roller.

9. The embossing apparatus according to claim 5, wherein the second feeding path is set at a lower position relative to the second rubber embossing roller, so that the second web product is conveyed over a lower side of the second rubber embossing roller to reach and pass between the second rubber embossing roller and the second steel embossing roller.

10. The embossing apparatus according to claim 4, wherein the at least one intermediate embossing assembly includes:
    an intermediate rubber embossing roller; and
    an intermediate steel embossing roller adjacent to the intermediate rubber embossing roller;
    wherein the at least one intermediate web product is conveyed along an intermediate feeding path to reach and pass between the intermediate rubber embossing roller and the intermediate steel embossing roller, in order to have the intermediate embossed pattern formed on the at least one intermediate web product.

11. The embossing apparatus according to claim 10, wherein an intermediate feeding path is set at an upper position relative to the intermediate rubber embossing roller, in order to conduct the at least one intermediate web product to pass an upper side of the intermediate rubber embossing roller to be then conducted into and conveyed between the intermediate rubber embossing roller and the intermediate steel embossing roller.

* * * * *